United States Patent
Stage

(10) Patent No.: US 6,287,206 B1
(45) Date of Patent: Sep. 11, 2001

(54) LIMITED ANGLE UNIVERSAL JOINT

(76) Inventor: Jack W. Stage, 100 Mt. Lyell Dr., San Rafael, CA (US) 94903

( * ) Notice: Subject to any disclaimer, the term of this patent is extended or adjusted under 35 U.S.C. 154(b) by 0 days.

(21) Appl. No.: 09/416,644

(22) Filed: Oct. 12, 1999

Related U.S. Application Data

(60) Provisional application No. 60/105,599, filed on Oct. 26, 1998.

(51) Int. Cl.[7] .................................................. F16D 3/16
(52) U.S. Cl. ......................... 464/119; 464/136; 464/147; 81/177.6; 81/177.75
(58) Field of Search ................................. 464/112, 114, 464/119, 136, 147; 81/177.6, 177.75

(56) References Cited

U.S. PATENT DOCUMENTS

| | | | | |
|---|---|---|---|---|
| 541,997 | * | 7/1895 | Fravega et al. | 464/119 |
| 1,185,199 | * | 5/1916 | Hauer | 464/119 |
| 2,005,202 | * | 6/1935 | Pilger | 464/119 |
| 2,256,624 | * | 9/1941 | Odlum | 464/119 |
| 2,304,766 | * | 12/1942 | Pratt | 464/119 |
| 2,498,465 | | 2/1950 | Thomas . | |
| 2,636,759 | * | 4/1953 | Rueb | 464/119 |
| 2,826,252 | * | 3/1958 | Stillwagon, Jr. | 464/119 |
| 3,650,123 | | 3/1972 | Sheppard, Jr. . | |
| 5,458,028 | * | 10/1995 | Cleveland, III | 464/119 |
| 5,496,219 | * | 3/1996 | Anspach, Jr. et al. | 464/147 |
| 5,766,081 | | 6/1998 | Desmaris . | |

* cited by examiner

Primary Examiner—Lynne H. Browne
Assistant Examiner—Aaron M Dunwoody

(57) ABSTRACT

A univesal joint, block and pin type, in which a carefully designed and sized center section will limit angulation of the joint at any angle desired up to, but not including an angle which will cause lockup.

1 Claim, 1 Drawing Sheet

LIMITED ANGLE UNIVERSAL JOINT

CROSS-REFERENCE TO RELATED APPLICATION

This application is entitled to the benefit of Provisional Patent Application Ser. #60/105,599 filed Oct. 26, 1998.

BACKGROUND-FIELD OF INVENTION

This invention relates to a universal joint as is commonly used with socket wrench sets.

BACKGROUND-DESCRIPTION OF PRIOR ART

Mechanics and do-it-yourselfers, in daily use of their socket wrench sets and other rotatable and angularly adjustable tools employ the use of a universal joint to angulate the drive to accommodate unusual or difficult locations to reach. The standard block and pin universal joint used has no means to limit angulation and when angled to approximately 42 or 43 degrees, locks up or twists back on itself. In U.S. Pat. No. 2,498,465 (1950) Thomas describes a block and pin universal joint on a shaft with it sliding means and collar mechanism connected by a link which will hold the universal joint at any angle by the position of the sliding means. He also incorporates this same mechanism for two universal joints in series to increase the potential angle of workability. This device is cumbersome and large, with a long shaft and bulky side appendages requiring a large working area which is not commensurate with the available working space oil on most modern automotive type machines of other appliances. Desmarais, in Patent 5,766,081 describes specifically angled ears with specific end radii and specific rotational pin spacing which allows contact of the ears at 45 degrees angulation of the joint. However lockup still occurs at approximately 42 degrees and the contact points of the ears is at an extremely thin portion of both ears which would be prone to fracture when mechanics put heavy pressure on the tool. Manufacturers of impact tools have made ball and socket universal joints with complex means of angulation and conveying impact forces but with limited angulation and at at extremely high cost. There is no simple, inexpensive limited angle block and pin universal joint for every day use which is no larger than the currently used universal joints and which will fit into the confined work areas that mechanics have to deal with while maintaining an angle limitation of 40 or less degrees.

SUMMARY

In accordance with the present invention, a universal joint with standard male and female ends, but they may be of other form, and a rotatable and angularly adjustable center block, which by beveled extensions, the angle of the bevel and the spacing of the pivotable pins and holes determined by the degree of angle desired and the size of the tool, produce limitation of allowed angulation at any degree of angle up to a point just prior to that at which lockup would occur.

OBJECTS AND ADVANTAGES

The objects and advantages described in the present invention are:
(a) to provide a block and pin type universal joint which will do everything that the currently used standard universal joints of the same type except fail by locking up;
(b) to provide a block and pin type universal joint which may have angulation limited at any degree desired up to the point of lock up;
(c) to provide a block and pin type limited angle universal joint which may be placed together in series to increase rotational angulation capability without lockup;
(d) to provide a block and pin type limited angle universal joint of essentially the same diameter as currently used rotatable and angularily adjustable tools;
(e) to provide a block and pin type limited angle universal joint free of external appendages which would prevent its use in closely confined spaces.

DRAWING FIGURES

REFERENCE NUMERALS IN DRAWINGS

| | | | |
|---|---|---|---|
| 11 | female end section | 12 | male end section |
| 13 | yoke or groove | 14 | lateral wall of yoke |
| 15 | yoke abutment wall | 16 | retaining pin hole |
| 17 | rounded terminal end of yoke | 18 | pivotal, retaining pin |
| 19 | center section | 20 | lateral core extension |
| 21 | square core of 19 | 22 | top of T |
| 23 | bevel on top of T | 24 | pivotal pin hole, center |
| 25 | limit point | | |

DESCRIPTION—FIGS. 1 AND 2—PREFERRED EMBODIMENT

Figure 1:
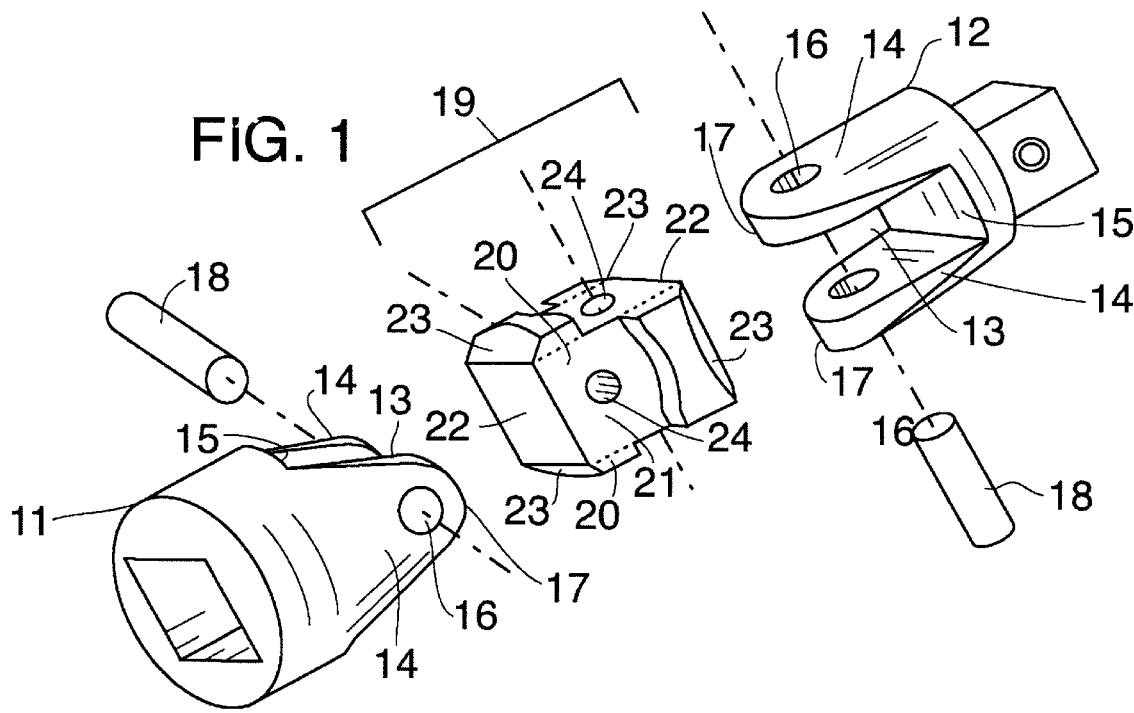
FIG. 1 shows an exploded view of this universal joint.
Figure 2:
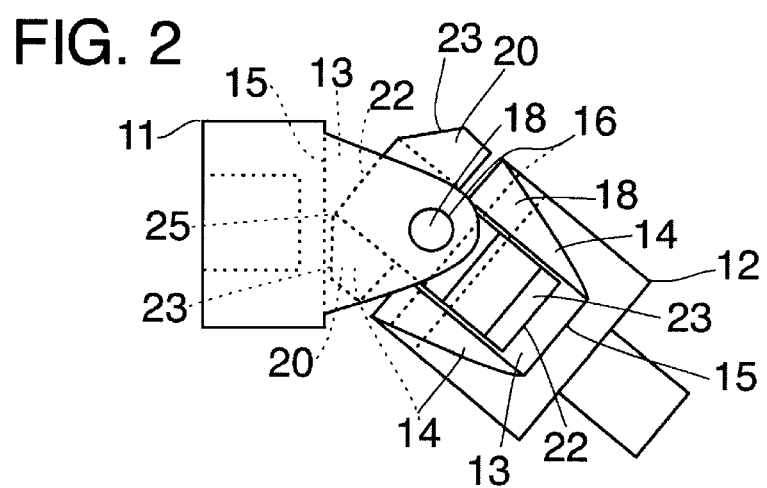
FIG. 2 shows a lateral view of this universal joint at its maximum degree of angulation.

Refering to the drawings, FIGS. 1 and 2, with greater particularity, this limited angle universal joint has end sections 11 and 12, section 11 representing the female portion of this universal joint, and section 12 representing the male end although these end sections may be of any configuration desired. Each of the sections has a yoke 13 on the medial end formed by lateral walls 14, end abutment wall 15, retaining pin holes 16 in the lateral walls 14, and a rounded medial terminal end 17. Retaining pins 18 run through holes 16 and pivotal pin holes 24 of the center section. The width of the yokes on either end section are equal as are the depths.

The center, angle limiting section 19 is the shape of two T's, the top of the T's being at opposite ends and at 90 degrees to each other, each having a thickness to slip into the equal width yokes 13 and thereby creating a common center core section 21. Each "T" amounts to lateral extensions 20 off a basic square center core 21. This square center core 21 is bar shaped. The most distal surface of the T tops 22 and end of the square core 21, shown here as flat, have bevels 23 on the most lateral edges. Pivotal holes 24 are bored through the square core 21, one each perpendicular to the flat sides of square core 21, at 90 degrees to each other, closely adjacent to each other, the mid point between them being the mid point of square core 21.

Refering particularly to FIG. 2, this universal joint is shown at maximum angulation of the current prototypes, namely 40 degrees, but other angle limitation may be used. The center section 19 rotates around pin 18 passing through holes 24 of the center section 19. The rounded terminal end of the yoke 17 allows the lateral walls 14 of the yoke 13 to clear the lateral extensions 20 of the "T" on the other end during rotation. At maximum angulation, a beveled surface 23 of the center section 19 rests flat against abutment wall 15. In this drawing a small gap is shown for clarity. The point 25, that is the junction of the beveled surface 23 and the flat end surface 22 must rest against abutment wall 15 at less than or equal to one half of the diameter or middle point of the abutment surface 15. This allows the flat adjacent surfaces 15 and 23 to distribute the pressure put on this joint over a large area rather than a V shaped or rounded linear contact which would act as a fulcrum to level pressure on pin 18.

In as much as the size of the end pieces 11 and 12 will vary in diameter according to tool size and the angle at which limitation will occur may be varied, the angles of beveled surfaces 23 relative to the flat end surfaces 22, the length of face 22, the distance from the middle of the flat abutment surface 15 to the center of the retaining pin hole 16, and the distance from the center of hole 24 to the mid point on face 22, which is also the middle of the end of the core 21, will vary with each factor and must be individually calculated for each specific combination of tool size and angle limitation desired.

ADVANTAGES

From the description above, a number of advantages become apparent for this limited angle universal joint.

(a) It is impossible to angulate this joint to lockup, therefore the frustration of getting tools into impossible positions is eliminated.

(b) By joining two joints in series it is possible to produce rotational motion around a corner up to 80 degrees through only a small opening, the size of the maximum tool diameter used.

(c) There is a solid effacement which limits angulation with no thin metal portions to fracture.

(d) Any angle less than the lockup angle may be chosen for production and use.

(e) It can replace and do everything that a conventional block and pin universal joint can do without the failures of the conventional joint.

OPERATION—FIG. 2

As rotational forces are applied at either end of this universal joint, the angulation of the center section 19 with either end section 11 or 12, gradually reverses front maximum to 0 at one end while the other end changes from 0 to the maximum angle and becomes totally opposite at 90 degrees of rotation, As rotation continues, this process of continuous reversals oscillates back and forth between alternate ends.

CONCLUSIONS, RAMIFICATIONS, AND SCOPE

Accordingly, the reader will see that this limited angle universal joint can do all of the applications of the currently used block and pin universal joints but without the failings, that is lockup or twisting back on itself as happens in conventional universal joints. It allows rotary motion to be conveyed through small openings where right angle ratchet drives cannot be used. It allows up to 80 degrees of angulation by putting two joints together in series and is capable of high torque loads not possible with the use of flexible drives. It has solid heavy metal contact to control angulation so is capable of taking heavy loads.

While this invention has been described in conjunction with a preferred embodiment thereof it is obvious that modifications and chances therein may be made by those skilled in the art to which it pertains without departing from the spirit and scope of this invention as defined by the claims appended hereto.

The scope of this invention should be determined by the appended claims and their legal equivalents rather than the examples given.

I claim:

1. A limiting angle universal joint comprising:

a male end section having a first yoke with parallel tapered sides and a flat abutment surface at the base of the yoke;

a female end section having a second yoke with parallel tapered sides and a flat abutment surface at the base of the yoke;

a center section having a first end extending into the first yoke and a second end extending into the second yoke, the first and second ends each having a flat top with a pair of beveled lateral core extensions extending from the flat top towards the middle of the center portion, wherein the first and second pairs of beveled extensions are oriented at right angles to each other, and, wherein the pair of beveled extensions act as stops that engage the flat abutment surfaces of the respective first and second yokes;

a first retaining pin pivotally connecting the first yoke to the center section;

and a second retaining pin pivotally connecting the second yoke to the center section, such that the axes of the first and second retaining pins are substantially at right angles to each other.

\* \* \* \* \*